United States Patent [19]

Nara et al.

[11] Patent Number: 4,651,702

[45] Date of Patent: Mar. 24, 1987

[54] AIR-FUEL MIXTURE HEATING DEVICE FOR INTERNAL COMBUSTION ENGINE

[75] Inventors: Akio Nara, Okazaki; Akio Yazawa, Obu; Yosinori Akiyama, Okazaki, all of Japan

[73] Assignee: Nippondenso Co., Ltd., Kariya, Japan

[21] Appl. No.: 775,244

[22] Filed: Sep. 12, 1985

[30] Foreign Application Priority Data

Sep. 17, 1984 [JP] Japan .................. 59-195230

[51] Int. Cl.⁴ ............................................. F02M 31/00
[52] U.S. Cl. ..................... 123/549; 123/545; 219/207
[58] Field of Search ............... 123/549, 545, 557, 552; 261/142; 219/205, 206, 207

[56] References Cited

U.S. PATENT DOCUMENTS

| 4,141,327 | 2/1979 | Marcoux | 123/549 |
| 4,327,697 | 5/1982 | Wada | 123/549 |
| 4,366,798 | 1/1983 | Goto | 123/549 |
| 4,377,148 | 3/1983 | Ishida | 123/549 |
| 4,387,676 | 6/1983 | Couceiro | 123/549 |
| 4,387,690 | 6/1983 | Chiavaroli | 123/549 |

FOREIGN PATENT DOCUMENTS

| 56-110550 | 9/1981 | Japan | 123/549 |
| 65849 | 4/1982 | Japan | 123/549 |
| 59-19809 | 6/1984 | Japan | 123/549 |

Primary Examiner—Ronald B. Cox
Attorney, Agent, or Firm—Cushman, Darby & Cushman

[57] ABSTRACT

A heating device for heating air-fuel mixture to be fed to an internal combustion engine has a PTC heat generator having a flat ring-like form with a portion of the inner peripheral surface thereof directly exposed to the passage for the mixture. The heating device also has a heat radiating member having an inner peripheral heat radiating surface confronting the mixture passage and jointed to the PTC heat generator in heat conducting relation therewith.

8 Claims, 11 Drawing Figures

AIR-FUEL MIXTURE HEATING DEVICE FOR INTERNAL COMBUSTION ENGINE

BACKGROUND OF THE INVENTION

The present invention relates to an air-fuel mixture heating device for use in internal combustion engines.

In general, the operation of an internal combustion engine before the warming up and hence at low engine temperature involves a problem in that the fuel supplied by the carburetor is not satisfactorily evaporated so that a large quantity of fuel in liquid state is supplied to the engine such as to worsen the combustion, resulting in an unstable state of engine operation as compared with that after the warming up. In order to obviate this problem, it has been proposed to supply richer air-fuel mixture to the engine during the warming up than in the period after the warming up, thereby stabilizing the engine operation during the warming up. The supply of rich mixture, however, not only increases noxious components such as unburnt hydrocarbon (HC) and carbon monoxide (CO) but increases the fuel consumption uneconomically.

If the fuel in liquid phase supplied from the carburetor during the warming up of the engine is sufficiently evaporated into gaseous phase, the engine will be able to operate stably even with a lean mixture. Such a lean mixture in turn will decrease the noxious exhaust emissions, as well as the fuel consumption.

From this point of view, the specification of U.S. Pat. No. 4,141,327 proposes an intake heating device which is designed for promoting the evaporation of liquid fuel during warming up of the engine.

This intake heating device, however, suffers from the following disadvantages. Firstly, it is to be pointed out that the PTC (Positive Temperature Coefficient of Resistivity) element, which serves as a heat generator constituting an essential part of this device, requires quite a complicated assembly process and raises the production cost because of its honeycomb type structure.

Secondly, the honeycomb type structure which has large wall thickness inevitably has a large outer dimensions in order to obtain a required total cross-sectional area of passages. It is rather difficult to find the room for accommodating such large-sized structure.

Thirdly, small passages for mixtures defined in the honeycomb type PTC heat generator tend to be blocked due to freezing of water content of the air in the mixture, particularly when the engine is used in the atmosphere of low temperature and high humidity, resulting in an engine stall due to shortage of the air-fuel mixture.

SUMMARY OF THE INVENTION

Accordingly, an object of the invention is to provide an air-fuel mixture heating device for internal combustion engines, which has an improved heating capability to vaporize the liquid fuel in the air-fuel mixture frequently appearing at low engine temperature, has a sufficient cross-sectional area of the air-fuel passage to avoid a blockage of the passage due to freezing, and further has an excellent productivity.

To this end, according to the invention, there is provided an air-fuel mixture heating device for internal combustion engines having an intake passage through which an air-fuel mixture is fed to the engine, comprising: a PTC heat generator disposed along the wall surface defining the intake passage, at least a portion of the PTC element being exposed to the intake passage for direct contact with the mixture flowing in the intake passage; and a highly heat conductive heat radiating member jointed to the PTC heat generator in a heat transfer relationship therewith and having a tubular heat radiating surface extending along the wall surface defining the intake passage.

DESCRIPTION OF THE PREFERRED EMBODIMENTS

Preferred embodiments of the invention will be described hereinunder with reference to the accompanying drawings.

Figure 1:
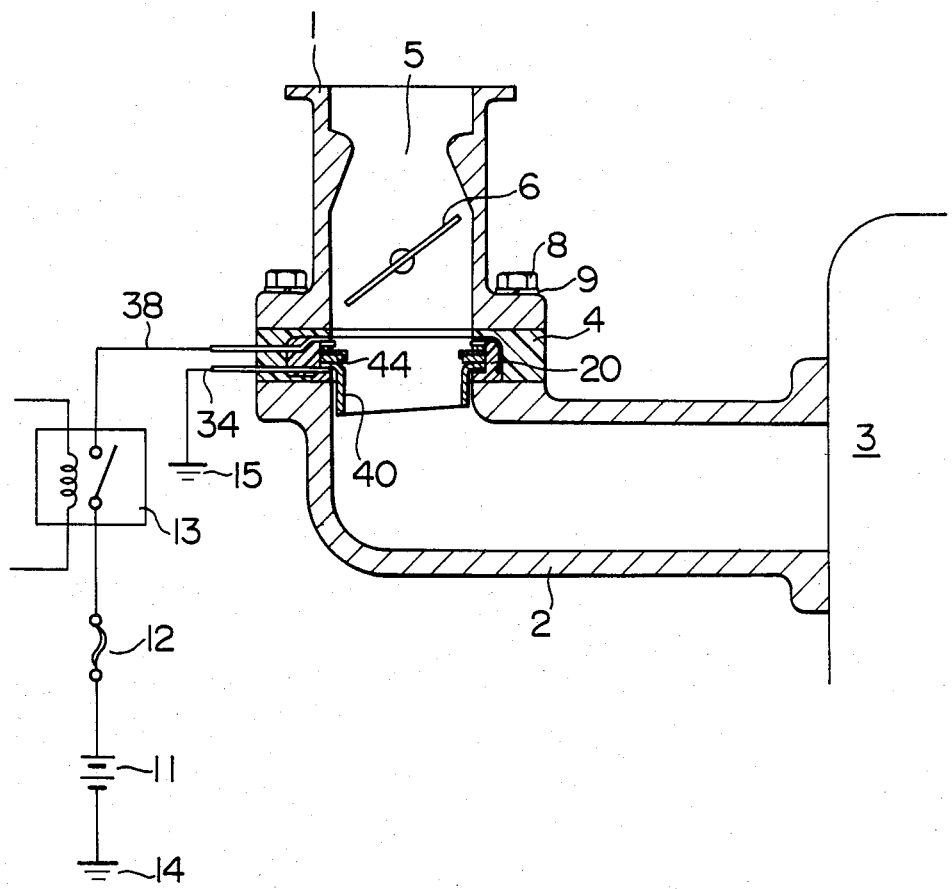
FIG. 1 is a sectional view of an embodiment of an air-fuel mixture heating device of the invention, attached to a carburetor of an internal combustion engine.
Figure 2:
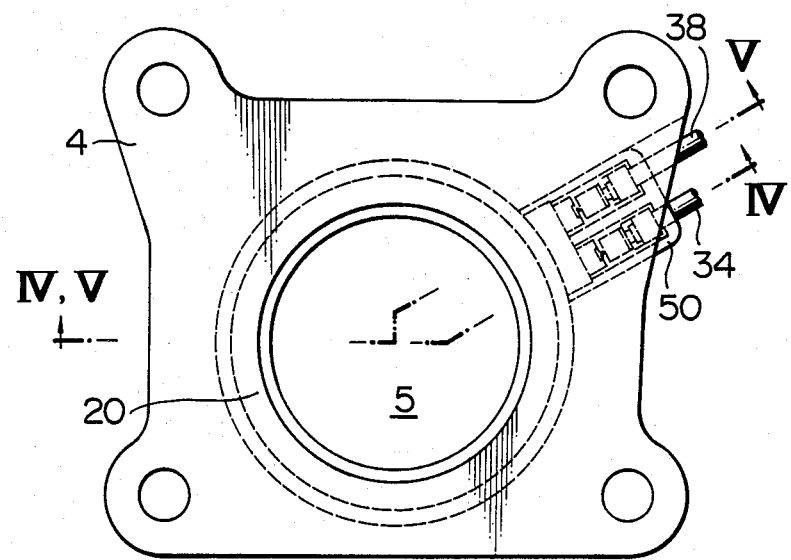
FIG. 2 is a plan view of a heat insulator incorporated in the air-fuel mixture heating device embodying the present invention.
Figure 4:
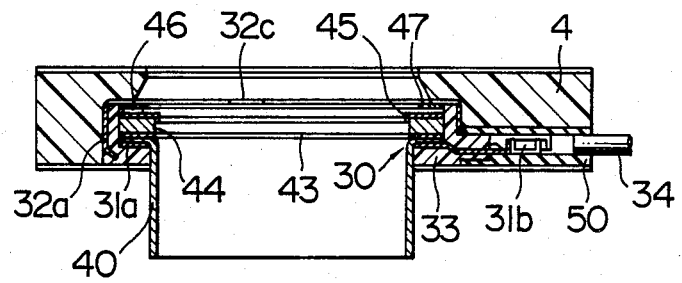
FIG. 4 is a sectional view taken along the line IV—IV of FIG. 2.

Referring to FIG. 1, a carburetor 1 is communicated with ambient air through an air cleaner which is not shown. An intake pipe 2 is connected to an internal combustion engine 3. A heat insulator 4 made of a synthetic resin is interposed between the intake pipe 2 and the carburetor 1 such as to insulate the heat. The carburetor 1 is disposed in a passage 5 through which air-fuel mixture is led to the engine. The flow rate of the air-fuel mixture in the passage 5 is controlled by means of a throttle valve 6. The carburetor 1 is fixed to the intake pipe 2 through a heat insulator 4 by means of bolts 8 and washers 9. An air-fuel mixture heating device 20 of the invention has major parts such as a PTC heat generator 44, an extension pipe 40 constituting a heat radiator, and so forth. This device 20 lightly fits on the inner periphery of the heat insulator 4. The detail of the air-fuel mixture heating device 20 will be explained later with reference to FIGS. 2 to 7. The air-fuel mixture heating device 20 is supplied with electric power from a series of batteries 11, through a circuit which includes a relay 13 for selectively completing the circuit and a fusible like 12 for ensuring the safety of the circuit. Numerals 14 and 15 denote grounding terminals, while 34 and 38 designate lead lines.

The detail of the air-fuel mixture heating device 20 will be explained hereinunder. As will be seen from FIG. 2 which is a plan view of the air-fuel mixture heating device 20 assembled together with the heat insulator 4, the device 20 as a whole lightly fits in a bore in the heat insulator 4 which defines the passage 5 mentioned before. Lead lines 34 and 38 for the power supply to the air-fuel mixture heating device 20 extend radially outwardly from a side of the heat insulator 4.

Figure 3:
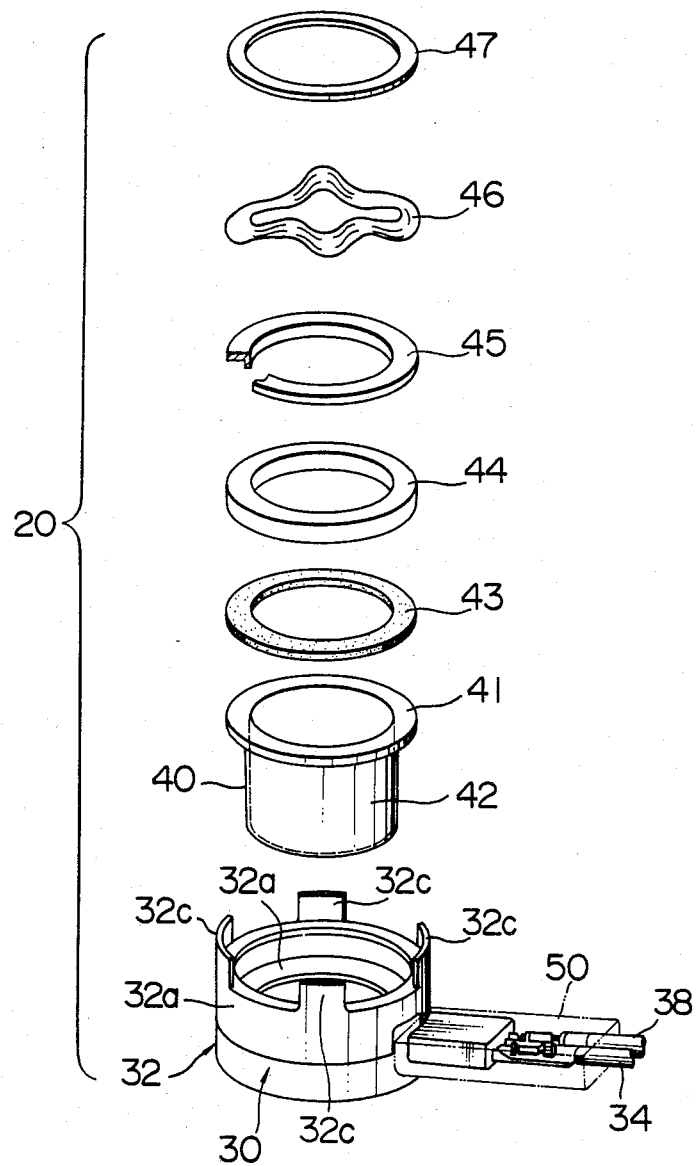
FIG. 3 is an exploded perspective view of a heating device embodying the present invention.

Referring now to FIG. 3 which is an exploded perspective view showing the air-fuel mixture heating device 20 in the state before the assembly, the parts constituting the device 20 are adapted to be housed by a housing 30 which will be described later. The air-fuel mixture heating device has an extension pipe 40 which is shown at the lowermost portion right above the housing 30 in FIG. 3. The extension pipe 40 is made of a metal having a good heat conductivity, and has two integral portions: namely, a flange portion 41 having a high degree of flatness and designed for receiving heat from the heat generator disposed at the upper side thereof, and a heat radiating pipe portion 42 exposed to the mixture passage 5 and adapted to heat the air-fuel mixture flowing in the passage 5. An ring-shaped cushioning member 43 made of a material having a high electric and heat conductivity, e.g., graphite filler, is placed in contact with the flange portion 41. The cushioning member 43 in turn is overlain by a ring-shaped PTC heat generator 44. A cover 45 having an L-shaped cross-section and made of a material having a high heat conductivity is placed on the PTC heat generator 44 such as to cover the top surface of the PTC heat generator 44 and an upper portion of the inner peripheral surface of the same. On the cover 45 is placed a spring 46 for suitably loading the stack of the parts. A ring plate 47 is seated on the spring 46. After these parts are placed in the mentioned order within the housing 30, pawls 32C on the upper peripheral edge of the housing 30 are bent inwardly such as to press and retain the ring plate 47, thereby fixing the members 40, 43, 44, 45, 46 and 47 within the housing 30.

A description will be made hereinunder with reference to FIGS. 4 to 7. The housing 30 has a terminal minus 31 shown in FIGS. 6a, 6b and a terminal plus 31 shown in FIGS. 7a, 7b the terminal minus 31 and the terminal plus 32 being partly embedded in a common resin member 33 thus forming an unit.

Figure 6A:
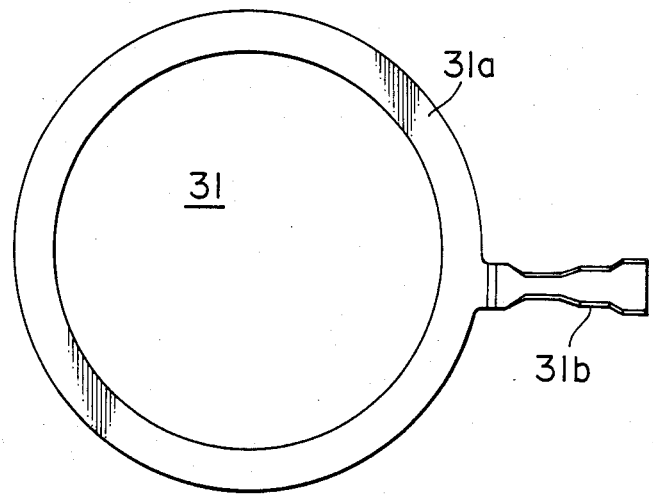
FIGS. 6a and 6b are a plan view and a sectional view, respectively, of a terminal minus 31.
Figure 6B:
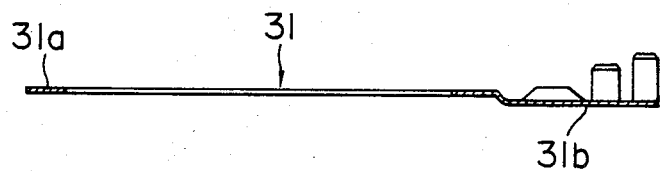

The terminal minus 31 shown in FIGS. 6a and 6b is made of a metallic material having a high electric conductivity, and is composed of a ring portion 31a and a terminal portion 31b. The terminal minus 31 is placed, when the housing 30 is formed, such that the ring portion 31a provides the bottom surface of the housing 30. A terminal portion 31b is exposed outside the resin member 33.

Figure 5:
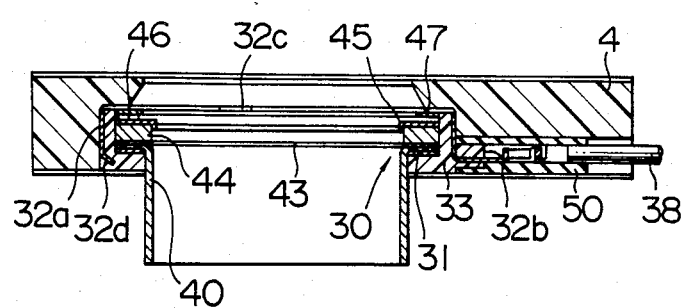
FIG. 5 is a sectional view taken along the line V—V of FIG. 2.
Figure 7A:
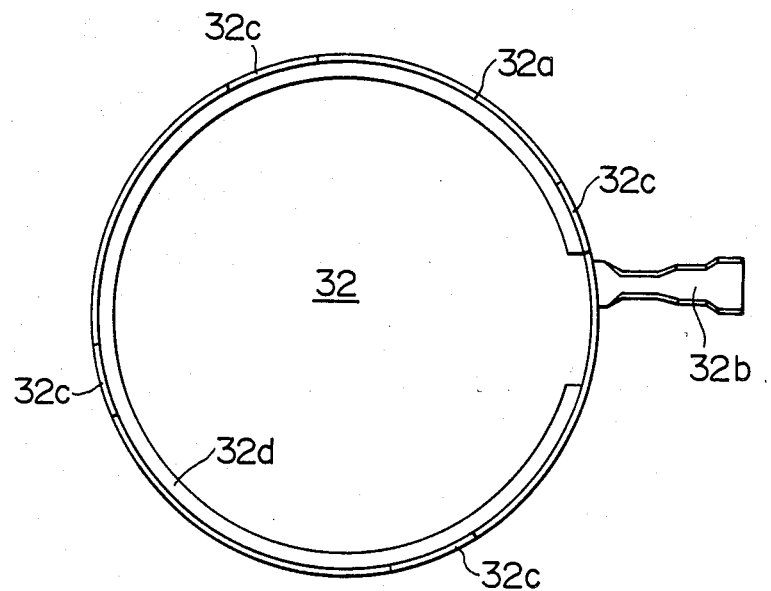
FIGS. 7a and 7b are a plan view and a sectional view, respectively, of a terminal plus 35.
Figure 7B:
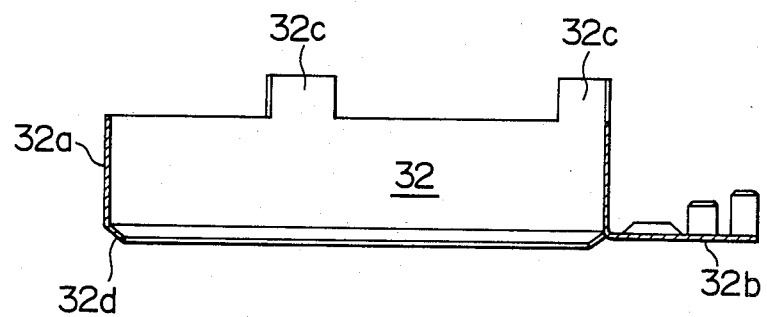

The terminal plus 32 shown in FIGS. 7a and 7b has a cylindrical portion 32a, terminal portion 32b and a pawl portion 32c. The cylindrical portion 35 has an end 32d which is bent radially inwardly. When the housing 30 is formed, the cylindrical portion 32a is disposed on the outer peripheral surface of the housing 30 such that the terminal portion 32b is exposed outside the resin member 33, as shown in FIG. 5. A rubber bush 50 serving as an insulating protecting cover is received in a conduit portion through which the lead lines 34 and 38 are led outside. Namely, the terminal minus 31 and the terminal plus 32 are formed as a unit with the resin member in the state explained before, and the lead wires 34, 38 which are beforehand provided with the rubber bush 50 thereon are secured by caulking to the terminals 31b, 32b of the terminal minus 31 and the terminal plus 32, with the rubber bush 50 fitting in a predetermined portion, thus completing the housing 30 as shown in FIG. 3. Then, the parts 30, 40, 43, 44, 45, 46 and 47 constituting the air-fuel mixture heating device 20 are fixed in the manner explained before, thus completing the assembly of the air-fuel mixture heating device 20. The thus formed air-fuel mixture heating device 20 lightly fits in the heat insulator 4.

As explained before, the upper portion of the inner peripheral surface of the PTC heat generator is covered by the cover 45, while the lower portion of the same inner peripheral surface is exposed directly to the mixture passage 5. Therefore, the heating device 20 can serve appreciably even in the initial period of operation of the heating device at which the heat radiation pipe portion 42 of the extension pipe has not received yet sufficient amount of heat, thus meeting the heating demand quickly.

The direct exposure of the PTC heat generator into the mixture passage involves a problem in that, in the event of fracture of the PTC heat generator, the fractions of the heat generator may be sucked into the engine dangerously.

In the described embodiment of the invention, however, the PTC heat generator 44 has a simple flat ring-like form and is supported by the flange portion 41 having a high degree of flatness through the intermediary of the cushioning member 43, such as to avoid application of substantial bending stress to the PTC heat generator 44, so as to suppress the tendency for fracture of the same.

The PTC heat generator 44 is pressed towards the flange 41 by means of the spring 46 so that it is fixed against any movement which may be caused by, for example, vibration. If the spring 46 is arranged to directly contact the PTC heat generator 44, load will be inconveniently concentrated to the portions of the PTC heat generator contacted by the spring, resulting in a greater risk of fracture. In the described embodiment, however, the arrangement is such that the spring 46 acts on the PTC heat generator through the intermediary of the cover which serves to uniformly distribute the load of the spring over the entire area of the PTC heat generator 44, so that the risk of fracture is suppressed advantageously.

In most cases, the fracture of the PTC caused by a large impact is accompanied by radial cracks. According to the described embodiment, the cover 45 covers a portion of the inner surface of the PTC heat generator, such that the PTC heat generator 44 is sandwiched between the cover 45 and the flange 41. Therefore, fractions of the PTC heat generator, even in the event of a fracture, are prevented from falling into the passage 5.

Thus, the arrangement of the described embodiment permits the PTC heat generator to be directly exposed to the mixture passage 5 without the risk mentioned before.

Figure 8:
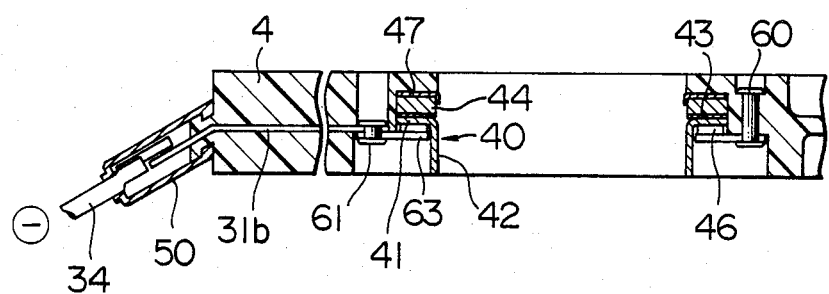
FIGS. 8 and 9 are sectional views similar to FIGS. 4 and 5 showing another embodiment of the invention.
Figure 9:
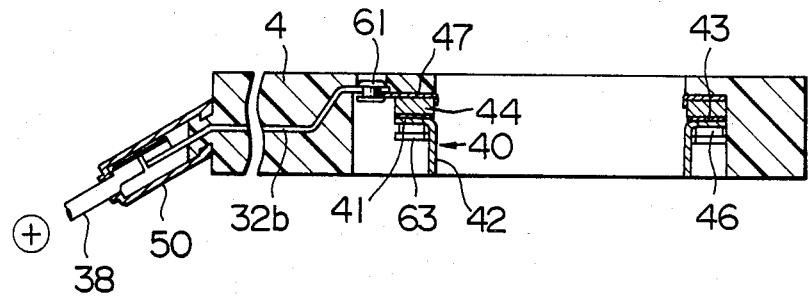

FIGS. 8 and 9 show another embodiment of the air-fuel mixture heating device of the invention in which the housing 30 is omitted. More specifically, in this embodiment, a ring plate 63 of a large diameter is combined with the ring plate 47 such that this combined structure plays the role of the housing 30 used in the preceding embodiment. Namely, this combined structure plays the same roles as the ring portions of the terminals 31, 32 and the role of the cover 45, with the PTC heat generator 44 and associated parts sandwiched between both ring plates. At the same time, the peripheral edge portion of the ring plate 63 is fixed to the insulator 4 by means of rivets 60, whereby the PTC heat generator 43 and the associated parts are fixed in an annular recess of the insulator. The terminal portions 31b and 32b are embedded in the insulator 4 and the ends of the terminals are fixed to respective ring plates 47 and 63 by means of rivets for electric connection therewith. It is to be noted that the resin member 33 is omitted from this embodiment. Although FIG. 8 shows only one rivet 60, it will be easy for those skilled in the art to understand that a plurality of rivets 60 are arranged along the periphery of the ring plate 63 so that the ring plate 63 is secured at a plurality of portions thereof to the insulator 4.

The air-fuel mixture heating device of the invention is intended for use in the beginning period of warming up of the engine in which the engine temperature is low. The operation of this device is as follows.

When the engine is started from cold state, an intake temperature sensor senses that the temperature of the intake air is below a predetermined level, and operates the relay 13 such as to complete the power supply circuit, so that electric power is supplied from the batteries 11 to the air-fuel mixture heating device 20 through the lead line 38. In the illustrated embodiments, the positive voltage of the batteries is applied to the upper side of the structure: namely, electric currents flows through the pawls 32c of the terminal plus 32, ring plate 47, spring 46, cover 45 and then flows across the PTC heat generator 44. The electric current then flows through the conductive cushioning member 43, extension pipe 40, terminal minus 31 of the housing 30 and is grounded as at 15 through the lead line 34.

As a result of the supply of the electric current, the PTC heat generator 44 generates heat. A part of the thus generated heat is transferred directly to the air-fuel mixture from the surface portion of the PTC heat generator exposed to the mixture passage, while another part of the heat is transmitted to the cover 45 on the upper side of the PTC heat generator 44. Still another part of the heat is transmitted through the cushioning member 43 to the flange portion 41 of the extension pipe 40 and then to the pipe portion 42 of the same. The heat transmitted to the cover 45 and the pipe portion 42 of the extension pipe 45 is then transferred to the mixture flowing in the passage 5.

It will be understood that, since the pipe portion 42 of the extension pipe 40 provides a large heat radiating area, the fuel in the liquid state can be sufficiently evaporated into gaseous phase.

The PTC heat generator 44 employed in the described embodiments has a simple ring-like form, which is easy to manufacture and less liable to be broken.

The use of the extension pipe 40 provides a large length of the heat radiating surface along the mixture passage so that any reduction in the cross-sectional area of the mixture passage 5 is necessary. This in turn eliminates the aforementioned problems such as the blockage of the restricted portions of the mixture passage due to freezing of water content in the air.

In the described embodiments of the invention, the PTC heat generator 44 has a portion which is directly exposed along the wall surface of the mixture passage 5 for direct contact with the air-fuel mixture. Therefore, fuel fraction which is still in the state of a liquid film immediately after a cold start of the engine is effectively heated and evaporated by the exposed portion of the PTC heat generator 44, in the transient period till the extension pipe is heated to a temperature high enough to steadily evaporate the liquid fuel. Thus, the invention ensures a sufficient evaporation of the fuel even in the state immediately after a cold start of the engine.

Although in the described embodiments the extension pipe is disposed at the downstream side of the PTC heat generator as viewed in the direction of flow of the mixture, this is not exclusive and the extension pipe may be disposed at the upstream side of the PTC heat generator.

Other changes and modifications are still possible within the scope of the invention which is limited solely by the appended claims.

What is claimed is:

1. An air-fuel mixture heating device for internal combustion engines having an intake passage through which an air-fuel mixture is fed to said engine, comprising:
    a PTC heat generator of a flat ring-shape having an inner peripheral surface extending substantially along the wall surface defining said intake passage, a part of said inner peripheral surface of said PTC heat generator being exposed for direct contact with said air-fuel mixture flowing in said intake passage; and
    a highly heat conductive heat radiating member joined to said PTC heat generator in a heat transfer relationship therewith and having a tubular heat radiating surface extending along said wall surface.

2. An air-fuel mixture heating device for internal combustion engines having an intake passage through which an air-fuel mixture is fed to said engine, comprising:
    a PTC heat generator of a flat ring-shape having an inner peripheral surface extending substantially along the wall surface defining said intake passage,
    a highly heat conductive heat radiating member located adjacent said PTC heat generator and having a flange portion corresponding in shape to said flat ring-shaped heat generator, and a tubular portion extending from said flange portion parallel to said air-fuel mixture flow, and
    a highly heat conductive cushioning member interposed between said flange portion of heat radiating member and said PTC heat generator.

3. An air-fuel mixture heating device for internal combustion engines having an intake passage through which an air-fuel mixture is fed to said engine, comprising:
    a PTC heat generator disposed along the wall surface defining said intake passage, at least a portion of said PTC element being exposed to said intake passage for direction contact with said mixture flowing in said intake passage; and
    a highly heat conductive cover of thin plate located adjacent said PTC heat generator, said cover having an annular shape provided with a flange along the inner periphery thereof, said annular shape corresponding to the shape of said PTC heat generator, and said flange extending along the inner peripheral surface of said PTC heat generator.

4. An air-fuel mixture heating device for internal combustion engines having an intake passage through which an air-fuel mixture is fed to said engine, comprising:
    a PTC heat generator of a flat ring-shape having an inner peripheral surface extending substantially along the wall surface defining said intake passage, a part of said inner peripheral surface of said PTC heat generator being exposed for direct contact with said air-fuel mixture flowing in said intake passage; and a highly heat conductive heat radiating member having a flange portion corresponding in shape to said flat ring-shaped heat generator and a tubular portion extending from said flange portion in the direction of said air-fuel mixture flow, said flange portion being connected to said heat generator through the intermediary of a highly heat conductive cushioning member.

5. An air-fuel mixture heating device according to claim 1, wherein said heat radiating member has a flange portion corresponding in shape to the flat ring-shaped heat generator, said flange portion being connected to said heat generator through the intermediary of a highly heat conductive cushioning member.

6. An air-fuel mixture heating device according to claim 5, wherein said heat generator is pressed by a spring member at its side opposite to the side thereof contacted by said cushioning member.

7. An air-fuel mixture heating device according to claim 5, wherein said heat radiating member also has a tubular portion extending from said flange portion in the direction of said air-fuel mixture flow, said flange portion being disposed opposite to the under surface of said PCT heat generator in heat transfer relationship therewith.

8. An air-fuel mixture heating device according to claim 4, wherein said heat generator is pressed by a spring member at its side opposite to the side thereof contacted by said cushioning member.

* * * * *